US011830346B2

(12) United States Patent
Carr, Jr.

(10) Patent No.: US 11,830,346 B2
(45) Date of Patent: Nov. 28, 2023

(54) SYSTEMS AND METHODS FOR PROVIDING SECURE COMMUNICATIONS BETWEEN GROUPS OF USERS

(71) Applicant: BlueWave Technology, Inc., Tulsa, OK (US)

(72) Inventor: Don Leslie Carr, Jr., Bonney Lake, WA (US)

(73) Assignee: BLUEWAVE TECHNOLOGY, INC., Tulsa, OK (US)

( * ) Notice: Subject to any disclaimer, the term of this patent is extended or adjusted under 35 U.S.C. 154(b) by 0 days.

(21) Appl. No.: 17/727,577

(22) Filed: Apr. 22, 2022

(65) Prior Publication Data

US 2022/0343751 A1    Oct. 27, 2022

Related U.S. Application Data

(60) Provisional application No. 63/178,431, filed on Apr. 22, 2021.

(51) Int. Cl.
*G08B 25/01* (2006.01)
*G08B 25/08* (2006.01)
*G08B 25/14* (2006.01)
*G08B 25/00* (2006.01)

(52) U.S. Cl.
CPC ......... *G08B 25/016* (2013.01); *G08B 25/007* (2013.01); *G08B 25/085* (2013.01); *G08B 25/14* (2013.01)

(58) Field of Classification Search
CPC .. G08B 25/016; G08B 25/007; G08B 25/085; G08B 25/14; G06Q 10/063; G06Q 50/26; H04W 4/021; H04W 4/06; H04W 4/08
See application file for complete search history.

(56) References Cited

U.S. PATENT DOCUMENTS

| 2004/0248597 | A1* | 12/2004 | Mathis | H04L 51/48 |
| | | | | 455/466 |
| 2015/0221051 | A1* | 8/2015 | Settino | G06Q 10/20 |
| | | | | 705/305 |
| 2019/0230466 | A1* | 7/2019 | Merjanian | H04W 4/023 |

* cited by examiner

*Primary Examiner* — Omeed Alizada (57) ABSTRACT

The present invention exists as a mobile application and includes systems and methods for allowing users and authority figures to communicate. Tenants living within a community are grouped by a site ID. Authorities such as security guards or law enforcement are assigned an organization ID corresponding with the site ID for the community they serve. Tenants may make requests through the application to authorities with a matching ID comprising anonymous reports, live chat, live calls, or dispatch to a certain location. Tenants may also bypass the corresponding authorities and contact a 911 dispatcher directly. Certain requests may open a direct line of communication between an authority and a tenant. Other requests, including anonymous reports and dispatches, may be sent to all authority figures with an organization ID matching the requesting tenant's site ID. Authorities may send broadcasts through the application to tenants with a matching ID. All communications are encrypted.

9 Claims, 7 Drawing Sheets

SYSTEMS AND METHODS FOR PROVIDING SECURE COMMUNICATIONS BETWEEN GROUPS OF USERS

The current application claims a priority to the U.S. Provisional Patent application Ser. No. 63/178,431 filed on Apr. 22, 2021.

FIELD OF THE INVENTION

The present invention relates generally to systems and methods for mobile communication applications. More specifically, the present invention is systems and methods for a mobile application that allows users to communicate with law enforcement or other authority figures.

BACKGROUND OF THE INVENTION

Cell phones are frequently used in times of emergency to call for aid. Traditionally a 911 call goes through a dispatcher, who routes the collected information to the proper first responder or agency. This arrangement relies on a middleman dispatcher who must handle all types of calls, can lead to a lag time in response, and prevents callers from communicating directly with law enforcement. While dispatchers do serve as a type of call filter so that law enforcement can better manage their finite resources, sometimes a direct line between the caller and law enforcement is preferred. Further, certain types of communication, such as reporting information to police, may not merit a 911 emergency call, and current means of making such a communication are not centralized or particularly clear.

The present invention aims to solve these problems by introducing a phone application that facilitates communication directly and indirectly between groups of citizens and corresponding law enforcement, security guards, campus police, or other authority figures.

SUMMARY OF THE INVENTION

The present invention exists as a mobile application and includes systems and methods for allowing users and authority figures to communicate. Specifically, tenants or other residents of living communities (hereinafter referred to as tenants) are assigned a site ID that correlates with the area that is served. Site IDs may be tied to specific school/university living zones, guests of a certain hotel, multi-family housing tenants, residents of HOA (home-owner association) communities, or any other subdivision related to place of residence. Tenants may make requests through the application comprising anonymous reports, live chat, live calls, dispatch to a certain location, or a 911 emergency call.

Authority figures such as security guards or law enforcement (hereinafter referred to as authorities) intended to respond to a specific area are assigned a corresponding organization ID that matches the site ID for that specific area. One or more databases store both a mapping of tenant device identifiers to site IDs and authority device identifiers to organization IDs. Requests (other than a 911 emergency call) from tenants are routed through a server which pings the one or more databases to determine the appropriate one or more devices to receive the request. Certain requests, such as for live chat or a live call, may open a direct line of communication between an authority and a tenant. Other requests, such as anonymous reports and dispatches, may be sent to all authority figures with an organization ID matching the requesting tenant's site ID. Similarly, an authority may send a broadcast that is received by all tenants with a site ID matching the broadcasting authority's organization ID. All communications between tenants, authorities, and the server are encrypted by 256-bit encryption.

DETAILED DESCRIPTION OF THE INVENTION

All illustrations of the drawings are for the purpose of describing selected versions of the present invention and are not intended to limit the scope of the present invention.

As can be seen in FIGS. 1-5, a mobile application consistent with various embodiments of the present invention, named "SecureX," facilitates systems and methods for communicating between groups of tenants and corresponding authorities. FIGS. 1-5 specifically show an embodiment of the mobile application as used by tenants.

Figure 6:
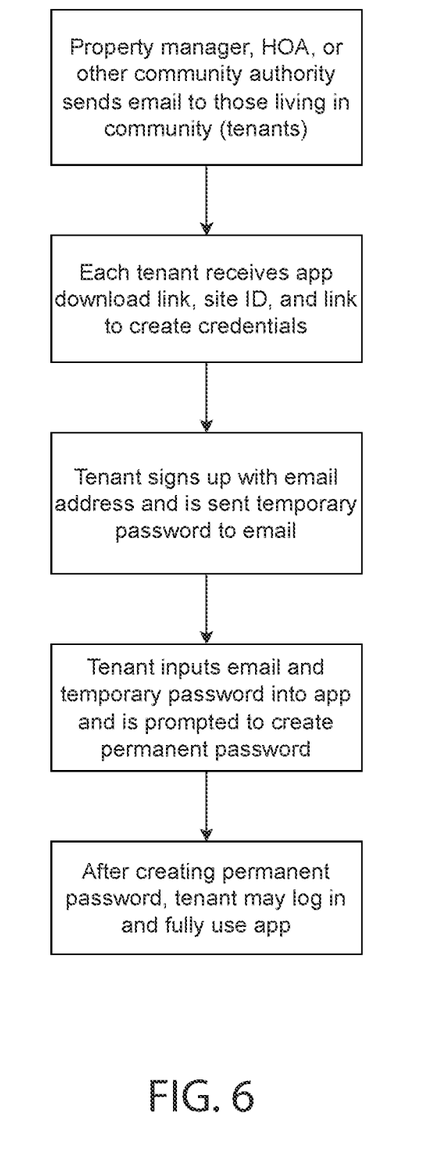
FIG. 6 is a flow diagram showing a method of creating a tenant account disclosed by the present invention.

A method for registering tenants for the mobile application is shown in FIG. 6. Before downloading the application, tenants are sent an email that contains a link to download the application, a link to create credentials for account access, and the site ID that will be used by that tenant's community group. After inputting their credentials, the tenant is sent an email with a temporary password. The tenant can now log into the app, where the tenant is prompted to create a permanent password. Only after creating a permanent password can the tenant use the mobile application.

A similar method may also be used for registering authorities to broadcast to tenants or to respond to tenant requests.

Figure 7:
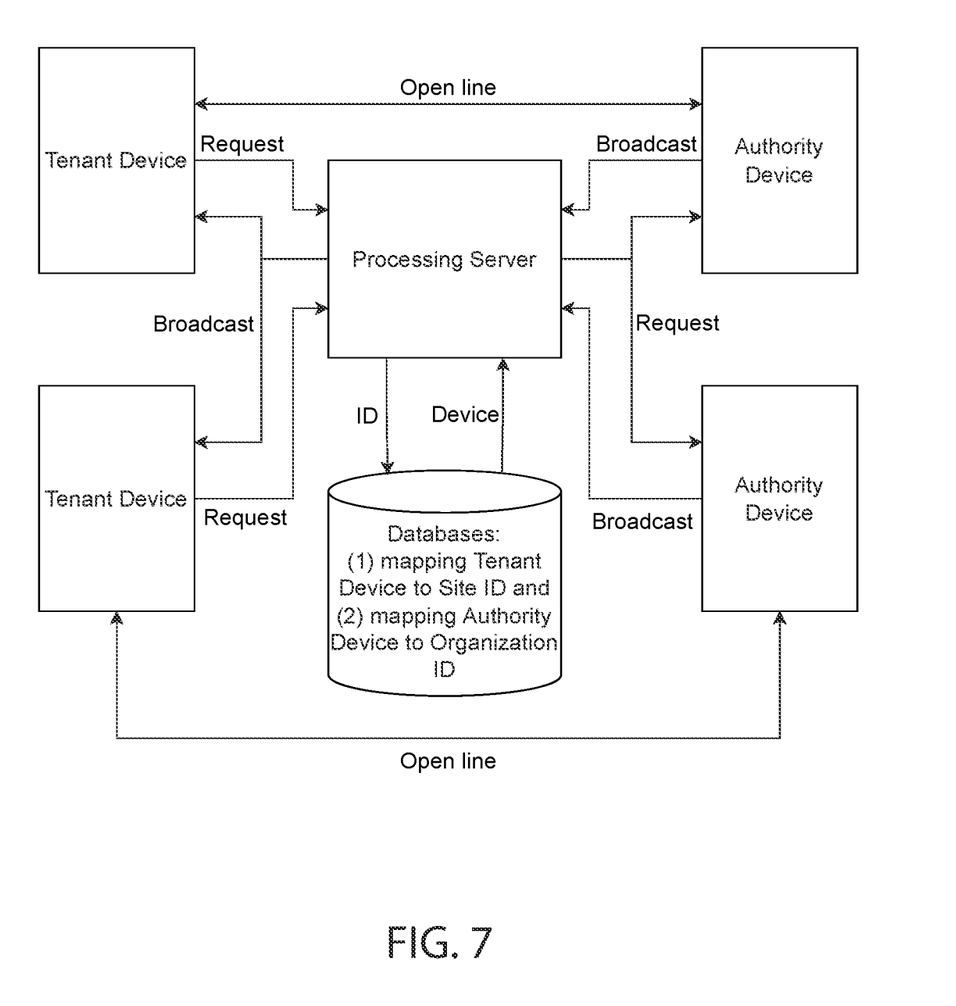
FIG. 7 is a flow diagram showing a system for sending and receiving requests and responses as disclosed by the present invention.

The system supporting the mobile application is shown in FIG. 7. Request payloads originating from a tenant's device are routed through a processing server, which, after a database lookup, passes the request to the appropriate authorities with an organization ID matching the site ID of the requesting tenant. Contents of the request payload will vary based on the type of request being sent. In some cases, such as a request to initiate a direct text chat or voice call with an authority, the processing server arbitrarily selects an available authority and sends a single request to the selected authority. In other cases, such as a request for dispatch or anonymous report, the request is sent to all authorities with an organization ID matching the site ID of the requesting tenant, so that authorities may respond appropriately. Similar to the requests from tenants sent to all authorities, an authority may also initiate a broadcast that is routed through the processing server and delivered to all tenants with a site ID corresponding to the sending authority's organization ID.

The mobile application's main menu 100 comprises a plurality of interactable buttons. Options button 101 provides links to account settings, such as modifying contact information or password, and a link back to the main menu 100. The options button 101 remains accessible on the application as other screens or menus are navigated by the tenant. The main menu further comprises an anonymous report button 102, which links to FIG. 2 to file an anonymous report; a live chat button 103, which links to FIG. 4 and subsequently FIG. 5 to live chat with an authority; a dispatch button 104, which links to FIG. 3 to dispatch a security agent; a call button 105, which initiates a direct phone call with one authority selected from the group of corresponding authorities; and an emergency button 106, which initiates a direct phone call to a 911 dispatcher.

Figure 2:
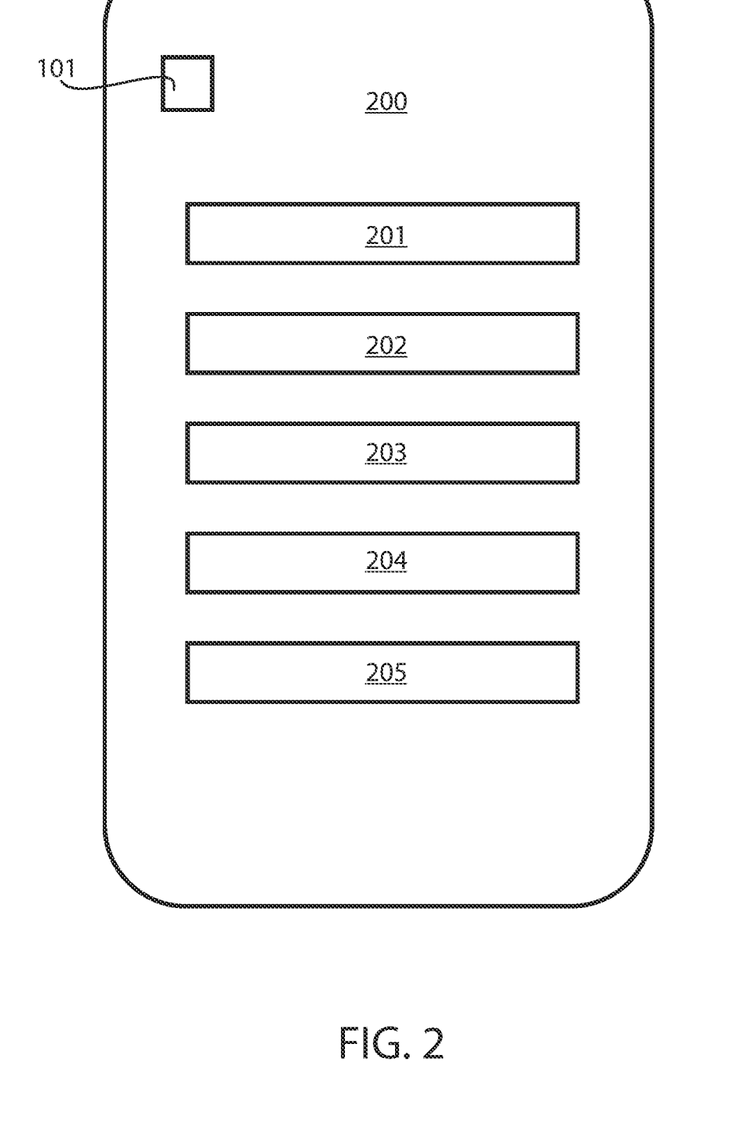
FIG. 2 is a diagram of the present invention as a mobile application.

The mobile application's anonymous report menu 200 comprises a plurality of interactable buttons. Along with options button 101, the anonymous report menu 200 further comprises theft report button 201, violence report button 202, verbal report button 203, sexual report button 204, and other report button 205. When one of the report buttons 201-205 is pressed, the tenant navigates to a screen with a text form field, in which more detail about the anonymous report may be added. The text of the anonymous report, along with the details of the report button that was pressed, are included with the tenant's site ID in a request payload and sent to the processing server. All of the one or more authorities with an organization ID matching the tenant's site ID then receive the request payload, and a historical record of the request is stored on the processing server.

Figure 3:
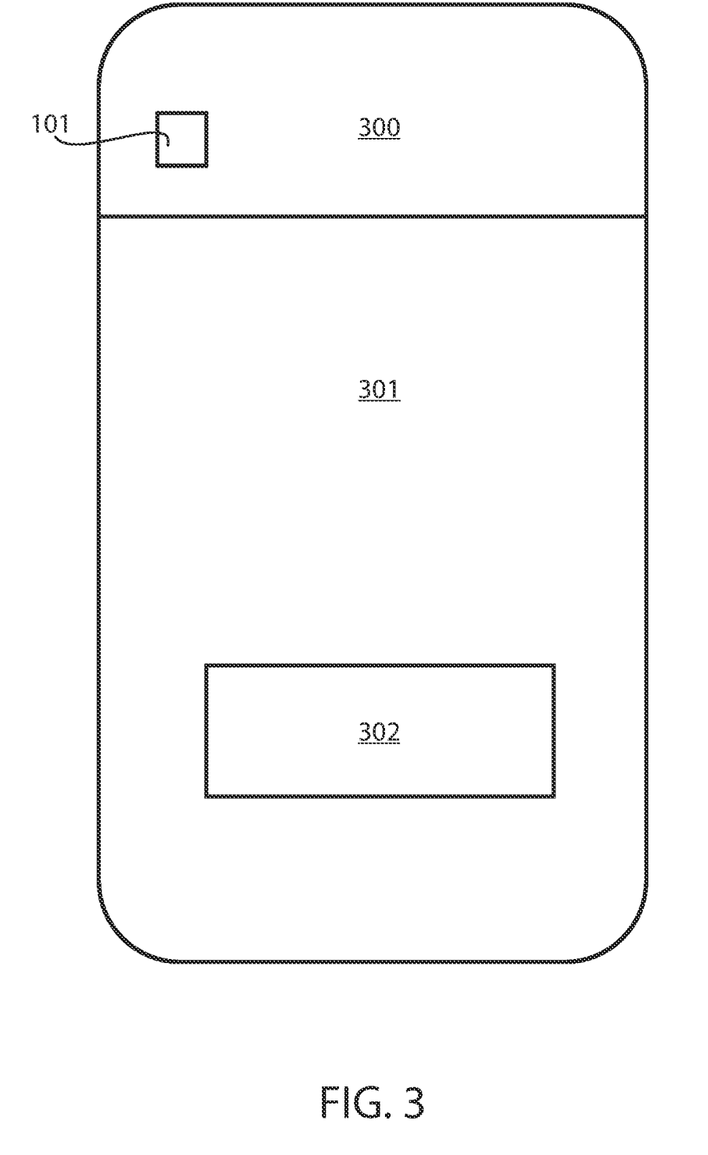
FIG. 3 is a diagram of the present invention as a mobile application.

The mobile application's dispatch interface 300 comprises options button 101, a map overlay 301, and a dispatch menu 302. Locations may be pinned on the map overlay 301 by the tenant, and when using the dispatch menu 302, the tenant may select whether to request a dispatch to one of the pinned locations, or to the tenant's current location. The geolocation of the selected pinned location or the tenant's current location is included with the tenant's site ID in a request payload and sent to the processing server. All of the one or more authorities with an organization ID matching the tenant's site ID then receive the request payload, and a historical record of the request is stored on the processing server. If the tenant selected to request a dispatch at their current location and moves after the request is sent but before a dispatcher arrives, an updated request containing the tenant's new geolocation is sent to all of the one or more authorities with an organization ID matching the tenant's site ID. This may be particularly useful in cases where a tenant is fleeing from a situation that requires an immediate dispatch, so that responders do not arrive at a tenant's previous location after the tenant has fled elsewhere. Like other requests made through the processing server, a historical record of the dispatch request is stored on the processing server.

Figure 4:
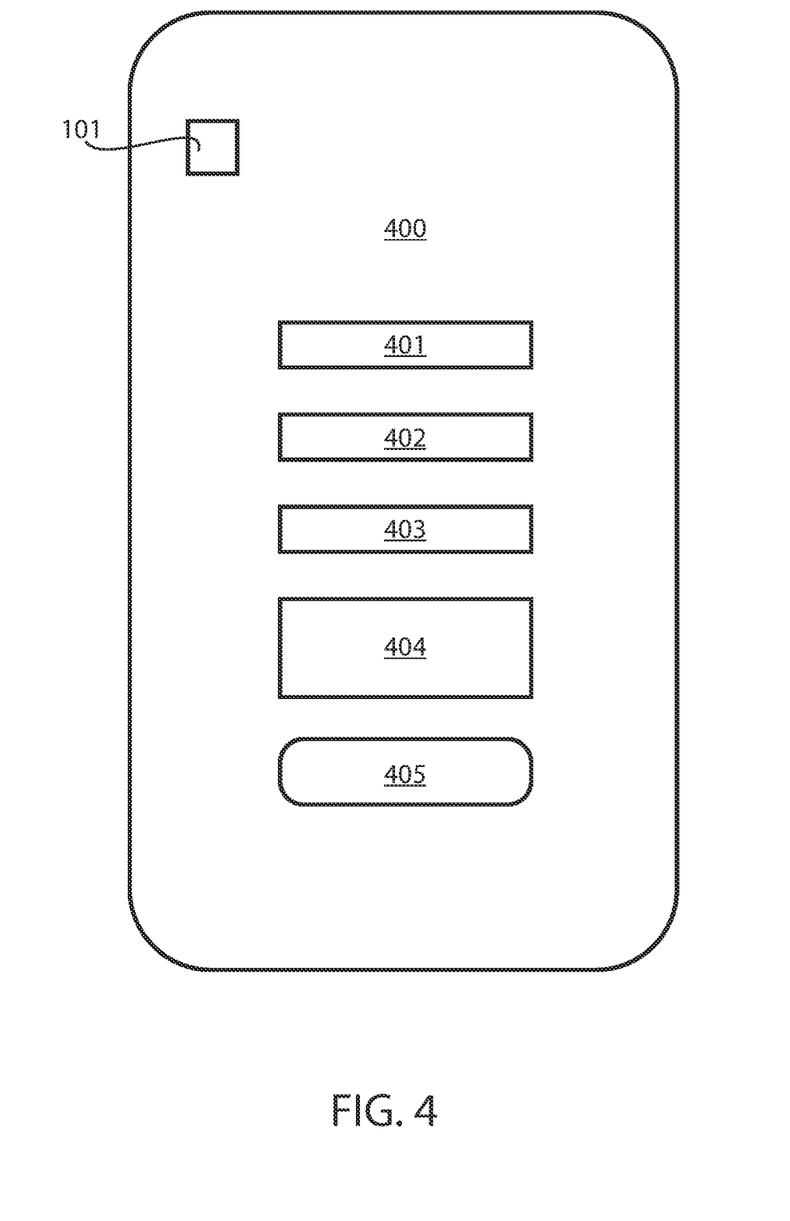
FIG. 4 is a diagram of the present invention as a mobile application.
Figure 5:
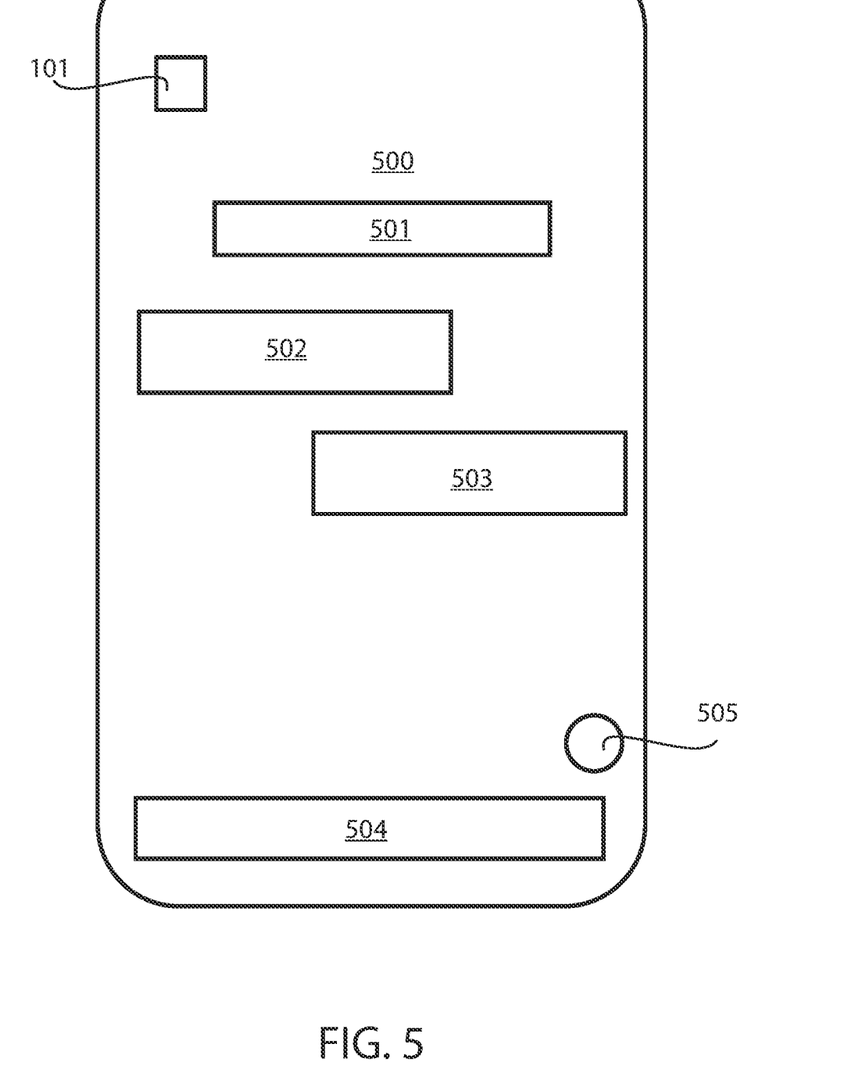
FIG. 5 is a diagram of the present invention as a mobile application.

The mobile application's live chat menu 400 comprises a plurality of text form fields: name field 401, email field 402, phone number field 403, and details field 404. Live chat menu 400 further comprises a chat request button 405. After chat request button 405 is pressed, a request payload object is generated containing name, email, phone number, and additional details, along with the tenant's site ID and other information used to identify the sending mobile device (used to establish a direct connection between the tenant and authority). Instead of blasting the live chat request to all of the one or more authorities with an organization ID matching the tenant's site ID, in the case of a live chat request, the processing server arbitrarily selects a single available authority with the matching organization ID. Using the information provided in the request payload, the selected authority may then initiate a text chat as shown in FIG. 5. The mobile application's live chat screen 500 comprises an identification of the responding authority by name 501, zero or more received fields 502, zero or more sent fields 503, message input field 504, and send button 505. After a tenant makes a live chat request from live chat menu 400, live chat screen 500 opens that displays the responding authority name. Then the tenant and authority may proceed with a real-time text conversation. To send a message, the tenant enters text in the message input field 504 and then presses the send button 505. Note that although received field 502 is shown once and positioned above the sent field 503, communications between the tenant and authority may start and continue indefinitely in no particular order until the cause for the initial request is resolved. While the initial chat request goes through the processing server and is stored by the processing server along with the receiving authority, because the live chat itself is a direct communication, the contents of the conversation are not stored on the processing server.

Figure 1:
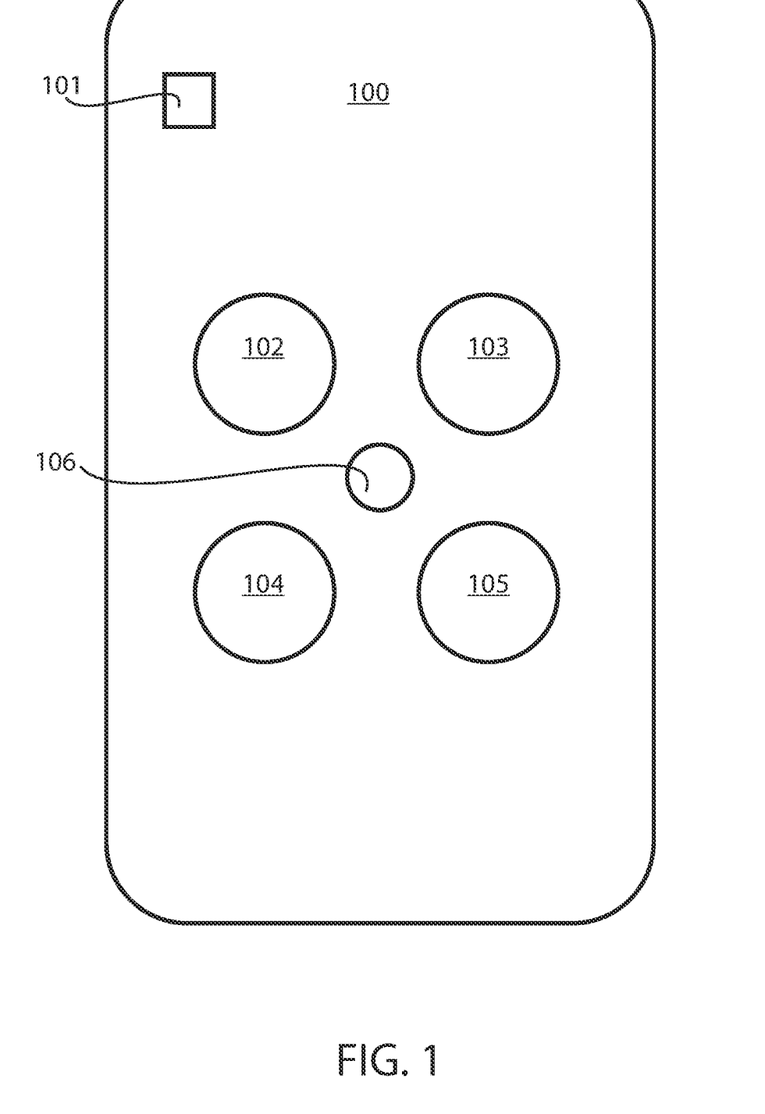
FIG. 1 is a diagram of the present invention as a mobile application.

The mobile application's live phone call option functions similarly to the live chat but is simpler. When a tenant presses call button 105, a request payload object is generated containing the tenant's site ID and other information used to identify the sending mobile device (used to establish a direct connection between the tenant and authority). Instead of blasting the live phone call request to all of the one or more authorities with an organization ID matching the tenant's site ID, in the case of a live phone call request, the processing server arbitrarily selects a single available authority with the matching organization ID. The tenant's mobile contact information is sent to the selected available authority, and the authority is directed to call the tenant as soon as possible. Like live chat requests, the initial request for a live phone call is stored on the processing server, but additional communications pass directly between the tenant and authority and are therefore not stored on the processing server.

An embodiment of the mobile application used by authorities is functionally similar to the embodiment of the mobile application described herein, with an option to initiate an authority broadcast instead of a tenant request and a menu to select and respond to requests for direct contact (live chat or phone call), but without menus to make dispatch requests or anonymous reports.

In cases when the mobile application is outside of cell phone or Wi-Fi coverage or is otherwise unable to connect to the processing server, requests or broadcasts are queued on the mobile device and sent when internet connectivity allows for the request or broadcast to be sent to the processing server.

The embodiment described by FIGS. 1-5 is only one possible embodiment of the invention, and the invention may also be accessed on personal computer devices through downloadable applications or web applications.

Overview:

The present invention is a real-time communication platform that allows end-users such as school/university students, hotel guests, tenants of multi-family housing, and residents of HOA communities to communicate in real-time with security guards, campus police, law enforcement, etc. End-users can also:

1. Dispatch security or police to their GPS location.
2. Live chat with security or law enforcement.
3. File an anonymous report.

Key Features of the Present Invention:
1. Four options for instant discrete security inquiry.
2. Live chat with security officer assigned to property.
3. Discreetly dispatch security officer to GPS location.
4. File an anonymous report.
5. Anonymous report can be sent directly to officer.
6. Call and speak with officer/authority.
7. Can be set up to send to police department or 911.
8. Authority side-can see tenant-dropped pins, see tenant locations, see tenant reports or speak to tenants The present invention provides more results and better outcomes:
1. Give the residents and tenants of the properties serviced the most powerful on-demand security tool in the industry.
2. Available on a variety of devices.
3. Streamline call response.
4. Create a digital trail of incidents
5. Save money on dispatch operations and answering services.
6. Residents and/or tenants can do the following all with the touch of a button:
7. Live chat with the security officer or dispatch agent assigned to the property.
8. Click-to-call.
9. Tenant can discreetly dispatch security officer to their GPS location on the property.
10. File an anonymous report.
11. Power your call-response and communications with the technology that will power the future.
12. Increase sales and revenue significantly by offering prospects and existing clients next generation solutions.

Although the invention has been explained in relation to its preferred embodiment, it is to be understood that many other possible modifications and variations can be made without departing from the spirit and scope of the invention.

What is claimed is:

1. A method for facilitating communication between one or more tenants and one or more authorities, comprising the steps of:
   registering one or more tenant communication devices for the one or more tenants;
   registering one or more authority communication devices for the one or more authorities;
   grouping the one or more tenants by a unique identification number tied to an area of residence;
   grouping the one or more authorities by a unique identification number tied to the area of residence that is managed by the one or more authorities;
   enabling a tenant to send a request, using the tenant communication device, to the authority communication device for one or more authorities with the matching unique identification number;
   opening a direct line of communication, based on the request, between the tenant communication device and the authority communication device for a single available authority of the one or more authorities with the matching unique identification number; and
   enabling an authority to send, using the authority communication device, a broadcast to the tenant communication device for one or more tenants with the matching unique identification number.

2. The method of claim 1 for facilitating communication between one or more tenants and one or more authorities; wherein:
   the direct line of communication comprises a live text chat or live phone call.

3. The method of claim 1 for facilitating communication between one or more tenants and one or more authorities; further comprising the step of:
   enabling the tenant to send, using the tenant communication device, a dispatch request to the tenant's current location to the authority communication device for one or more authorities with the matching unique identification number.

4. The method of claim 3 for facilitating communication between one or more tenants and one or more authorities; further comprising the step of:
   enabling the tenant to pinpoint a specific location on a map and send, using the tenant communication device, a dispatch request to the specific location to the authority communication device for one or more authorities with the matching unique identification number.

5. The method of claim 1 for facilitating communication between one or more tenants and one or more authorities; further comprising the step of:
   enabling the tenant to send, using the tenant communication device, an anonymous report to the authority communication device for one or more authorities with the matching unique identification number.

6. The method of claim 5 for facilitating communication between one or more tenants and one or more authorities; further comprising the step of:
   enabling the tenant to send, using the tenant communication device, the anonymous report directly to a police department or a specific police officer.

7. The method of claim 1 for facilitating communication between one or more tenants and one or more authorities; further comprising the step of:
   enabling the tenant to place a call, using the tenant communication device, directly to a 911 dispatcher.

8. A system for facilitating communication between one or more tenants and one or more authorities; wherein:
   one or more databases are populated with tenant contact information for one or more tenant communication devices mapped to a site identification number;
   one or more databases are populated with authority contact information for one or more authority communication devices mapped to an organization identification number;
   one of the one or more tenant communication devices sends a request comprising a request payload and a unique identification number to a processing server;
   the processing server, using the one or more databases populated with authority contact information, looks up the authority contact information corresponding with the request's unique identification number;
   the processing server sends the request payload to the corresponding authority communication devices, using the authority contact information corresponding with the request's unique identification number;
   one of the one or more authority communication devices sends a broadcast comprising a broadcast payload and a unique identification number to a processing server;
   the processing server, using the one or more databases populated with tenant contact information, looks up the tenant contact information corresponding with the request's unique identification number; and
   the processing server sends the broadcast payload to the corresponding tenant communication devices, using the tenant contact information corresponding with the broadcast's unique identification number.

9. The system of claim 8 for facilitating communication between one or more tenants and one or more authorities; wherein:
- the request payload further comprises the tenant contact information;
- the processing server sends the request payload to one of the one or more corresponding authority communication devices;
- the one of the one or more corresponding authority communication devices may respond directly to the tenant communication device that made the request; and
- the tenant communication device that made the request may respond directly to the one of the one or more corresponding authority communication devices.

* * * * *